United States Patent [19]

Wilkinson

[11] 4,433,353
[45] Feb. 21, 1984

[54] POSITIVE SEQUENCE UNDERVOLTAGE DISTANCE RELAY

[75] Inventor: Stanley B. Wilkinson, Havertown, Pa.

[73] Assignee: General Electric Company, King of Prussia, Pa.

[21] Appl. No.: 403,269

[22] Filed: Jul. 29, 1982

[51] Int. Cl.³ .......................... H02H 3/26; H02H 7/26
[52] U.S. Cl. ........................................ 361/80; 361/81; 361/67
[58] Field of Search ........................ 361/80, 81, 85, 67, 361/68, 69, 62, 65; 324/51, 52

[56] References Cited

U.S. PATENT DOCUMENTS 4,034,269 7/1977 Wilkinson .............................. 361/79
4,148,087 4/1979 Phadke ............................. 361/81 X
4,161,011 7/1979 Wilkinson ............................. 361/80
4,342,064 7/1982 Wilkinson .......................... 361/85 X Primary Examiner—Patrick R. Salce
Attorney, Agent, or Firm—John P. McMahon; William Freedman

[57] ABSTRACT

Disclosed is a positive sequence undervoltage distance relay that forms a part of a relay system that provides protection for a high voltage three phase transmission line. The undervoltage distance relay provides a high speed blocking function for use with the high speed tripping functions in the protective relay system. In one embodiment the undervoltage distance relay utilizes the positive sequence components of the three phase transmission line. In another embodiment the undervoltage distance relay utilizes the line to ground (or line to line) voltages and currents of the three phase transmission line.

12 Claims, 12 Drawing Figures

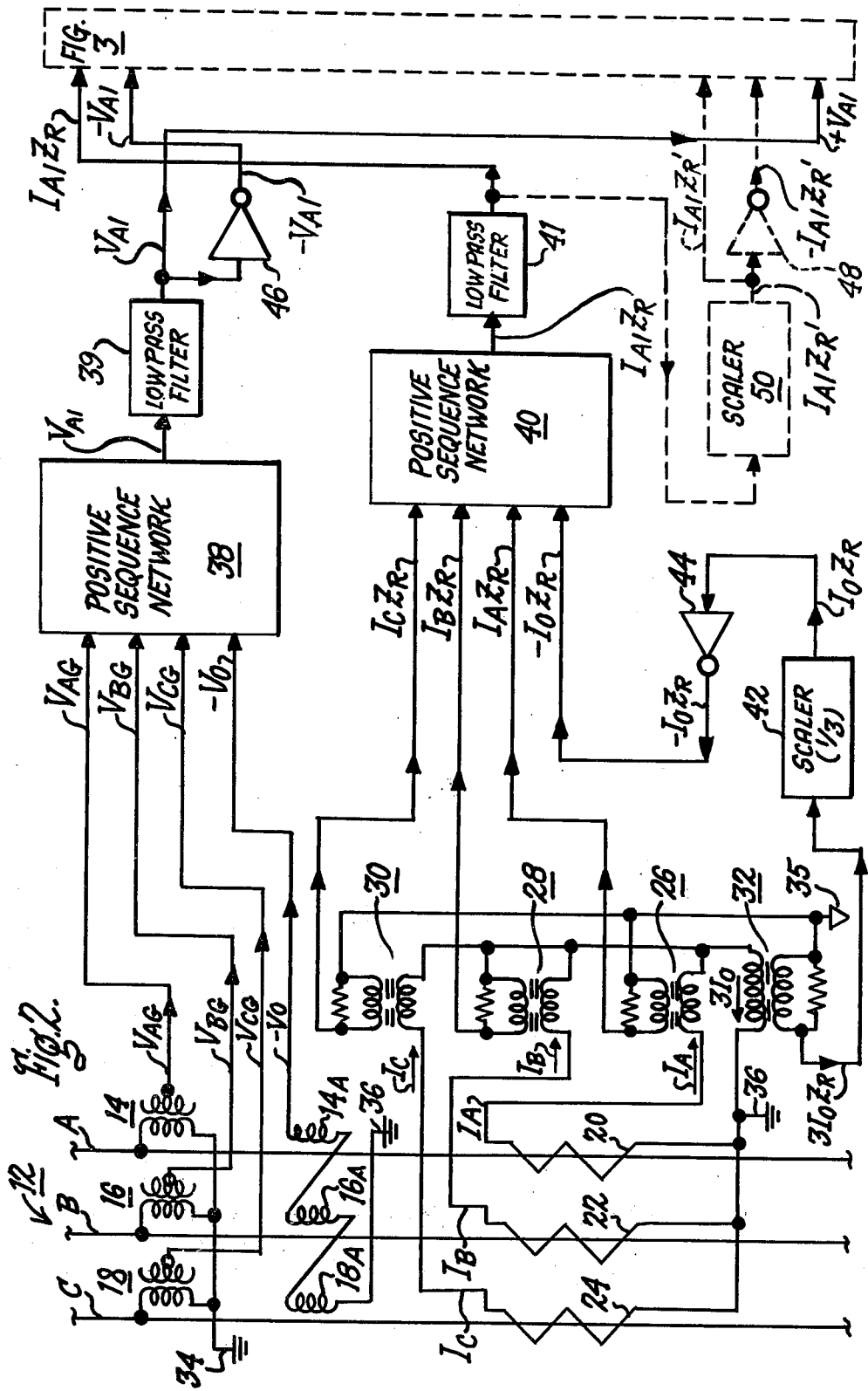

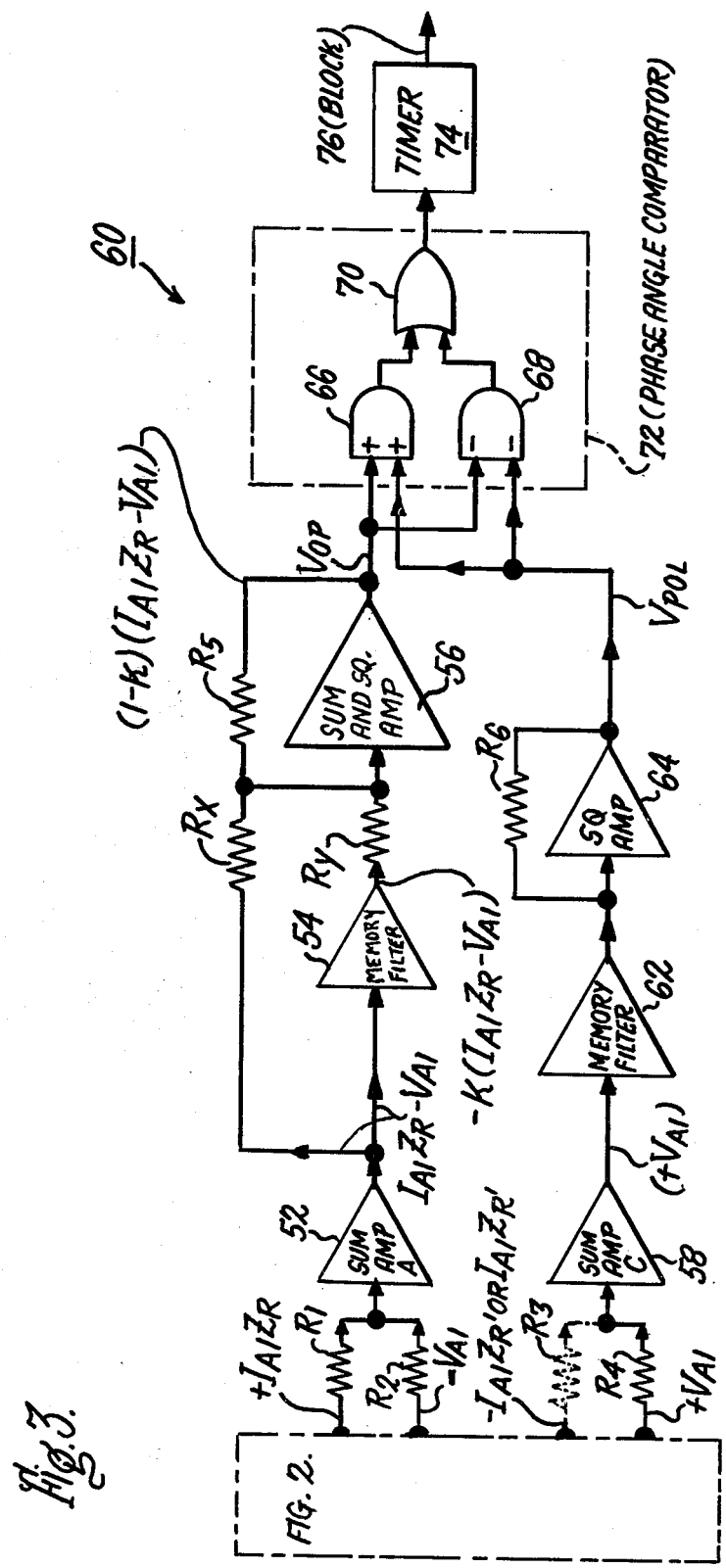

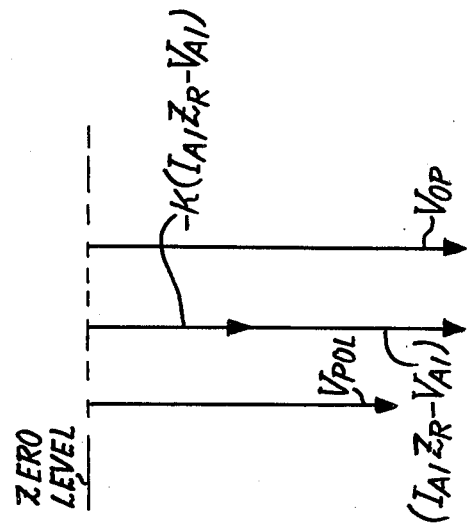
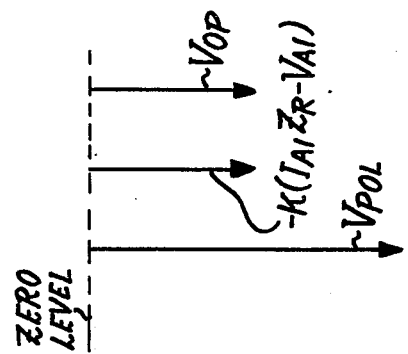
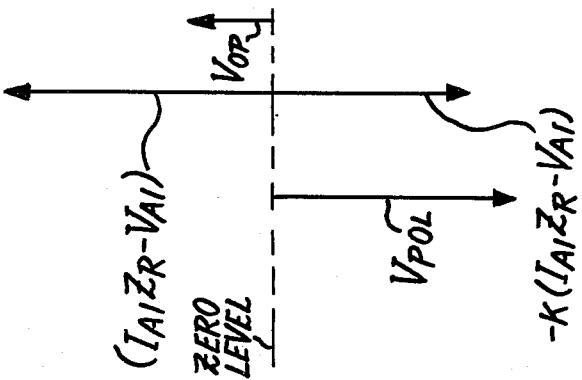

STEADY STATE OUTPUT (NO CURRENT) RESPONSE TO AN EXTERNAL 3φ FAULT IMMEDIATELY BEHIND RELAY $V_{OP} = 0$ SINCE $V_{A1} = 0$ AND $I_{A1}Z_R = 0$.
∴ NO 76 (BLOCK)

STEADY STATE OUTPUT (WITH FAULT CURRENT) RESPONSE TO AN EXTERNAL 3φ FAULT IMMEDIATELY BEHIND RELAY $V_{OP} = (1-k)(I_{A1}Z_R)$ SINCE $V_{A1} = 0$, THUS $V_{OP}$ IN PHASE WITH $V_{POL}$ ∴ 76 (BLOCK)

TRANSIENT OUTPUT (NO CURRENT) RESPONSE TO AN INTERNAL 3φ FAULT IMMEDIATELY IN-FRONT-OF RELAY $V_{OP} = KV_{A1}$ SINCE $V_{A1} = 0$ AND $I_{A1}Z_R = 0$.
THUS $V_{OP}$ IN PHASE WITH $V_{POL}$ ∴ 76 (BLOCK)

TRANSIENT OUTPUT (WITH FAULT CURRENT) RESPONSE TO AN INTERNAL 3φ FAULT IMMEDIATELY IN-FRONT-OF RELAY $V_{OP} = I_{A1}Z_R + KV_{A1}$ SINCE $V_{A1} = 0$ AND $|I_{A1}Z_R| > |KV_{A1}|$.
THUS $V_{OP}$ OUT-OF-PHASE WITH $V_{POL}$ ∴ NO 76 (BLOCK)

STEADY STATE OUTPUT (NO CURRENT) RESPONSE TO AN INTERNAL 3φ FAULT IMMEDIATELY IN-FRONT-OF RELAY $V_{OP} = 0$ SINCE $V_{AI} = 0$
AND $I_{AI} Z_R = 0$.
∴ NO 76 (BLOCK)

STEADY STATE OUTPUT (WITH FAULT CURRENT) RESPONSE TO AN INTERNAL 3φ FAULT IMMEDIATELY IN-FRONT-OF RELAY $V_{OP} (1-K)(-I_{AI} Z_R)$
SINCE $V_{AI} = 0$.
THUS $V_{OP}$ OUT-OF-PHASE
WITH $V_{POL}$ ∴ NO 76 (BLOCK)

POSITIVE SEQUENCE UNDERVOLTAGE DISTANCE RELAY

CROSS REFERENCE TO RELATED APPLICATION

The subject matter of this application is related to that of my application Ser. No. 403,270, filed July 29, 1982, and assigned to the same assignee of the present invention.

BACKGROUND OF THE INVENTION

The present invention relates to a protective system for a three phase high voltage transmission line and, more particularly, to an undervoltage distance blocking relay having means to more correctly sense the presence of an external fault, i.e., a fault behind the relay location.

As the voltage and current ratings of the length of transmission lines have increased, greater emphasis has been placed on decreasing the operating times for the protective relays associated with such lines so as to provide shorter fault clearing times. The desired relay operating times may be relatively small compared to the time constants of the natural frequency transients on long high voltage transmission lines.

In a directional comparison relaying system for a transmission line, there are typically distance relays at opposite terminals of the line, and each comprises a tripping unit and a blocking unit. If the tripping unit at one line terminal senses fault current flowing into the transmission line through this one terminal, it will act to produce tripping of a circuit breaker at this terminal unless the tripping unit is blocked from producing such tripping by a blocking signal received from the relay at the opposite terminal of the line. The primary purpose of the blocking unit of the relay system at the opposite terminal is to transmit a blocking signal if the fault that produced the fault current is external to the transmission line. If the fault is an internal fault, no blocking signal is transmitted and the tripping unit at the one end is free to produce tripping in response to the fault.

Since operation of the tripping unit must usually be delayed until the blocking unit of the relay at the opposite line terminal has had an opportunity to determine whether the fault is internal or external and to transmit a blocking signal if the fault is external, it is important to high speed tripping of the circuit breaker on internal faults, and hence minimum delay time, that such blocking unit be capable of quickly establishing whether the fault is an external one.

For long line applications, certain difficulties are encountered in quickly establishing the presence of an external fault. Some of these difficulties result from the fact that immediately following fault occurrence, the fault current in the line is the current associated with travelling waves propagated into the line by the fault. The steady-state fault current, which is the current that usual blocking relay responds to, is established only after some time has elapsed relative to the initiation of the travelling waves; and this can delay response of the blocking relay to an external fault.

One type of a blocking relay is an undervoltage distance relay which operates in response to undervoltage type conditions. A problem related to the undervoltage distance relay is a failure of the three phase potential supply to the relays from the power system. Such a failure may cause tripping relays to initiate tripping of the associated circuit breaker(s), particularly during periods of heavy power flow over the transmission line.

A further problem that may result from slow operation of the blocking relays is one that arises in those applications where the relays are fed from parallel current transformers and the fault current is such as to produce a reasonable probability of current transformer saturation. If the prefault residual flux levels in the current transformers are such that an adversely located current transformer saturates rapidly (whereas another current transformer saturates slowly); then, if the operating times of the blocking relays are delayed, the adversely located current transformer may saturate before the blocking relays operate, creating the possibility that the lack of operation of the blocking relays will allow the trip relays to operate and cause a false trip.

Accordingly, it is an object of my invention to provide more reliable detection of external faults where the current transformers are driven into their undesirable saturation condition.

A still further object of my invention is to provide a means for detecting the failure of the three phase potentials supplying the relay from the power system so as to inhibit the tripping of the associated circuit breakers.

It is a still further object of this invention to provide an undervoltage distance relay that is minimally affected by travelling waves on long lines, and is capable of fast operation in the presence of said travelling waves.

These and other objects of the present invention will become apparent to those skilled in the art upon consideration of the following description of the invention.

SUMMARY OF THE INVENTION

The present invention is directed to an undervoltage distance relay.

In one embodiment the undervoltage distance relay for associated with a three phase transmission line is adapted to provide a blocking signal in response to the occurrence of a fault behind the relay but providing no blocking signal in response to the occurrence of a fault on the transmission line in front of the relay. The relay comprises:

(a) means for developing quantities $-V_1$, $+V_1$ and $I_1Z_R$, where:

$V_1$ is a signal representative of the positive sequence component of the phase to ground or phase to phase voltages of the transmission line, $I_1$ is a signal representative of the positive sequence component of the phase currents of the transmission line when $V_1$ is related to phase to ground voltage and is a signal representation of the positive sequence component of the delta currents when $V_1$ is related to phase to phase voltage, $Z_R$ is a replica impedance of the equivalent positive sequence source impedance behind the relay and is of a magnitude equal to or greater than a quantity of a constant K times said equivalent positive sequence source impedance, (b) first summing means for summing $I_1Z_R$ and $-V_1$ and developing a signal $(I_1Z_R-V_1)$, (c) first means for receiving said signal $(I_1Z_R-V_1)$, and developing an output signal $(-K)(I_1Z_R-V_1)$, where K is a constant having a value selected between the range of 0.5 to 1.0 and has an out-of-phase relationship with $(I_1Z_R-V_1)$, said first means having a short term memory that enables it to continue developing said output signal after removal of or change to the received signal, (d) second summing means for receiving and summing together said signals $(I_1Z_R-V_1)$ and $(-K)(I_1Z_R-V_1)$, so as to develop a signal $(1-K)(I_1Z_R-V_1)$ expressed as an operating $V_{OP}$ signal, (e) second means for receiving said $+V_1$ signal and developing a polarizing signal $V_{POL}$ representative of the $+V_{A1}$ signal, said second means having a short term memory that enables it to continue developing said polarizing signal after removal of or change to the received $+V_1$ signal, and, (f) coincidence detection means for comparing the phase of the operate signal $V_{OP}$ with the phase of the polarizing signal $V_{POL}$ and developing a blocking signal when the phase coincidence between $V_{OP}$ and $V_{POL}$ exceeds a predetermined duration.

The features of the invention believed to be novel are set forth with particularity in the appended claims. The invention, itself, however, both as to its organization and operation together with further objects and advantages thereof may best be understood by reference to the following description taken in conjunction with the accompanying drawings.

BRIEF DESCRIPTION OF THE DRAWINGS

FIG. 2 is a block diagram for developing the signals for the circuit arrangement of FIG. 3 of the present invention.

FIG. 3 is a circuit arrangement of one embodiment of the present invention.

FIG. 4 shows the response of the present relay to No-Fault and No-Load conditions along the transmission line.

FIG. 5 shows the transient output response of the present relay to a condition in which no current is created by an External 3$\phi$ Fault occurring immediately behind the relay.

FIG. 6 shows the transient output response of the present relay to a condition in which fault current is created by an External 3$\phi$ Fault occurring immediately behind the relay.

DETAILED DESCRIPTION OF THE PREFERRED EMBODIMENT

Figure 1:
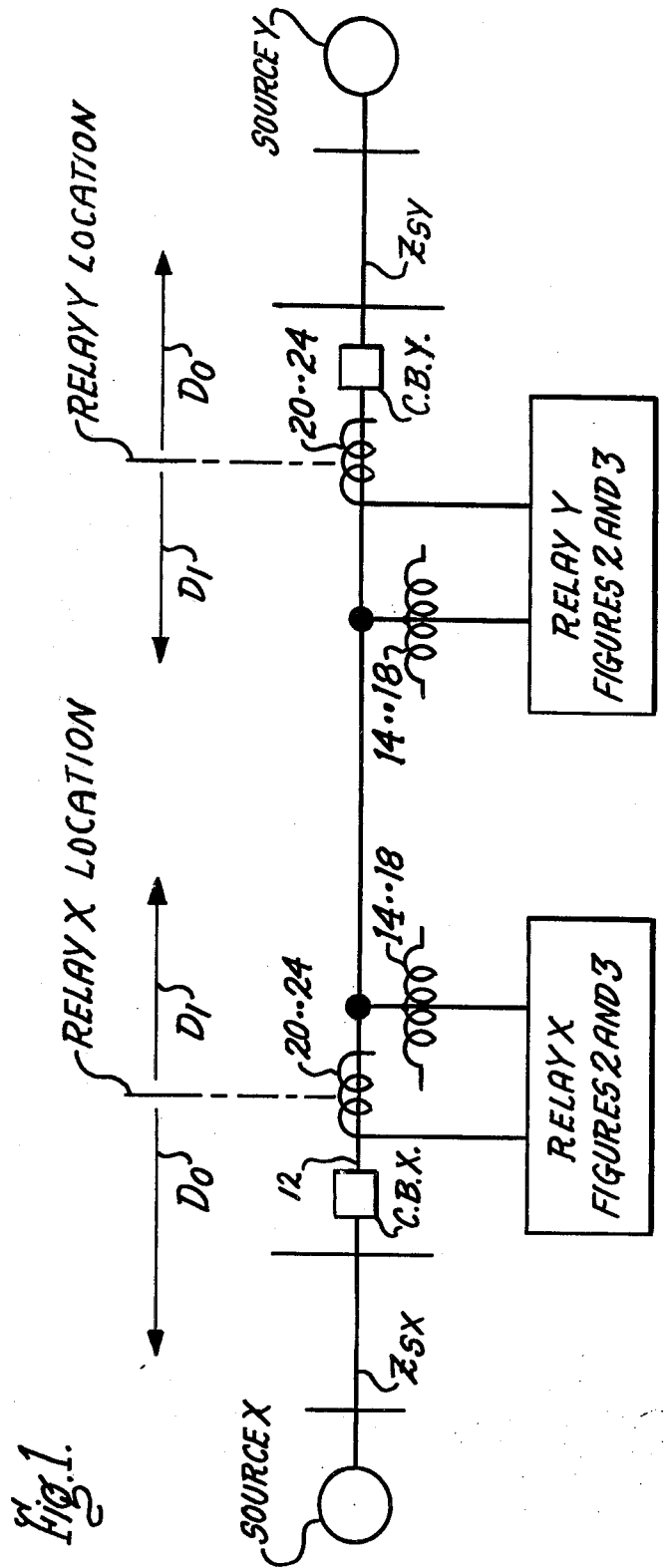
FIG. 1 is a one line representation of a transmission line for a three (3) phase A.C. power system showing the location of the relays of the present invention relative to the transmission line which is desired to be protected.

FIG. 1 is a one-line representation showing a transmission line 12 interconnecting two Power Sources, shown in FIG. 1 as Sources X and Y having respectively, source impedances $Z_{SX}$ and $Z_{SY}$. FIG. 1 further shows circuit breakers C.B.X and C.B.Y respectively interconnecting the Sources X and Y with the transmission line 12. The C.B.X is associated with RELAY X as shown in FIG. 1, whereas, C.B.Y is associated with RELAY Y as shown in FIG. 1.

The portion of the power system that is located behind the location of RELAY X is indicated by the arrow $D_O$ and the portion of the power system in front of RELAY X is indicated by the arrow $D_1$ at the RELAY X location. At the relay Y location, arrow $D_O$ indicates the portion of the power system behind the location of relay Y, and the arrow $D_1$ indicates the portion of the system ahead of the RELAY Y location.

As will be described hereinafter, the undervoltage distance relay of the present invention detects and responds to a fault located in the $D_O$ portion of the system, and, conversely the undervoltage distance relay of the present invention has compensation means so as not to be affected by a fault condition in the $D_1$ portion of the system. FIG. 1 shows RELAYS X and Y, each having a circuit arrangement of FIG. 3 to be described, both coupled to the transmission line via devices 14 ... 24 which are shown most clearly in FIG. 2.

The circuit arrangement of FIG. 2 is shown as being coupled to receive a plurality of source signals mainly comprised of $I_A$, $I_B$, $I_C$, $3I_O$, $V_{AG}$, $V_{BG}$, and $V_{CG}$ and $-V_O$, the first four of which are representative of the current conditions within the three phase transmission line 12 and the second four of which are representative of the voltage conditions within the three phase transmission line 12. The circuit arrangement of FIG. 2 and also the remaining FIGS. 3–12 show and describe the present invention with reference to phase A quantities. It should be recognized that the present invention is equally applicable to the development and usage of the phase B or phase C quantities.

The circuit arrangement of FIG. 2 receives the source signals and further develops these signals into desired quantities which are routed to the circuit arrangement of FIG. 3. Table 1 lists the received source signals, the developed signals of FIG. 2, the signals shown in FIG. 3, and also gives a general definition for each of the listed signals.

TABLE 1

| Quantities | General Definition |
| --- | --- |
| $I_A$, $I_B$ and $I_C$ | Current signals respectively representative of current flowing within phases A, B, and C of the transmission line 12. |
| $V_{AG}$, $V_{BG}$, and $V_{CG}$ | The voltages respectively representative of the voltage between phases A, B, and C and Ground of the transmission line 12. |
| $I_O$ | A current signal representative of the zero-sequence component of the phase |

TABLE 1-continued

| Quantities | General Definition |
|---|---|
| | currents flowing within the three (3) phase transmission line 12. |
| $V_O$ | A voltaoe signal representative of the zero-sequence component of the phase-to-ground voltages existing within the three phase transmission line 12. |
| $Z_R$ | A replica impedance of the equivalent positive sequence source impedance behind the relay and is of a magnitude equal to or greater than a quantity of a constant K times the equivalent positive sequence source impedance. |
| $Z'_R$ | A replica impedance having the same irpedance angle as ZR and whose magnitude is selected for each particular application. |
| $V_{A1}$ | A signal representative of the positive sequence component of the phase-to-ground voltage of the transmission line, referenced to the phase A to ground voltage. |
| $I_{A1}$ | A signal representative of the positive sequence component of the phase currents of the transmission line, referenced to the phase A current. |
| K | The constant associated with the adjustment of the $I_{A1}Z_R$-$V_{A1}$ quantities of FIG. 3. the K constant has a magnitude, a phase angle and also an associated time constant. |
| $V_{OP}$ | The operating signal of the undervoltage distance relay. |
| $V_{POL}$ | The polarizing signal of the undervoltage distance relay. |

The voltage quantity $V_{A1}$ of Table 1 may be generically stated for phase to ground voltages related to phases A, B, and C without the subscript A or phase-to-phase voltages and expressed accordingly as $V_1$. Similarly, the current quantity $I_{A1}$ of Table 1 may be generically stated without the subscript A and expressed accordingly as $I_1$ for (1) the positive sequence component of the phase currents $I_A$, $I_B$, and $I_C$ of the tramission line when $V_1$ is related to phase to ground voltages or (2) the positive sequence component of the delta currents $(I_A-I_B)$, $(I_B-I_C)$ and $(I_C-I_A)$ when $V_1$ is related to phase to phase voltages.

FIGS. 2 and 3 also show phasor quantities $I_{A1}Z_R$, $-I_{A1}Z_R'$ and $+I_{A1}Z_R'$ not listed nor generally described in Table 1, but which are to be discussed hereinafter with regard to their applicable relationship to the present invention.

Circuit arrangements shown in FIGS. 2 and 3 are comprised of a plurality of conventionaltype elements with the exception of the Positive Sequence networks 38 and 40 of FIG. 2 and the TIMER 74 of FIG. 3. The Positive Sequence networks 38 and 40 may be of the type described in U.S. patent application Ser. No. 297,542, of M. Hodges filed Aug. 31, 1981 which is assigned to the same assignee of the present invention. U.S. patent application Ser. No. 297,542 is a continuation of U.S. patent application 041,137 now abandoned. TIMER 74 may be of the type described in U.S. patent applications of T. B. Breen having Ser. Nos. 369,440 and 378,589 filed Apr. 19, 1982 and May 17, 1982, respectively, or it may be of the type described in my U.S. Pat. No. 4,161,011 issued July 10, 1979.

FIG. 3 further shows Memory Filters 54 and 62 which are preferably of the type disclosed in my U.S. Pat. No. 4,034,269 (see FIG. 7 and column 10, line 60 through column 11, line 33) issued July 5, 1977. All referenced U.S. Patents and U.S. Patent Applications are assigned to the same assignee of the present invention. All the above referenced U.S. Patents and U.S. Patent Applications are herein incorporated by reference.

As previously discussed the generic quantities $V_1$, and $I_1$ are related respectively to, phase-to-ground and phase-to-phase voltages, and phase currents and delta currents. For the description to follow the potential transformers 14, 16 and 18 of FIG. 2 are described as arranged so as to develop phase-to-ground type voltages and the current transformers 20, 22 and 24 of FIG. 2 and the transistors 26, 28, 30 and 32 of FIG. 2 are described as arranged so as to develop phase type currents. Although only the phase-to-ground voltages and phase currents are described, it should be recognized that I also contemplate the use of the phase-to-phase voltages and delta type currents in the practice of my invention in a manner similar to the description given hereinafter.

FIG. 2 shows current transformers 20, 22, and 24 respectively coupled to phases A, B, and C of the transmission line 12. FIG. 2 further shows one end of each of the current transformers connected to a substation ground 36. The current transformers 20, 22 and 24 are respectively coupled to the primary winding of transactors 26, 28 and 30 so as to respectively receive the coupled signal $I_A$, $I_B$, $I_C$. The other side of the primary winding of each transactors 26, 28 and 30 is coupled to one side of the primary winding of transactor 32 having its other side connected to the other side of each of the current transformers 20, 22 and 24. The arrangement of transactors 26, 28, 30 and 32 develops the signal $3I_O$ across the primary winding of transactor 32. Transactor 32 has one end of its primary winding connected to the substation ground 36.

One side of each of the secondary windings of transactors 26, 28, 30 and 32 is coupled to a reference potential 35 of the power supply for the protective relay. The transactors 26, 28, 30 and 32 each have their turns ratio, transfer impedance and resistive loading selected so as to multiply their respectively coupled signals $I_A$, $I_B$, $I_C$ and $3I_O$ by the quantity $Z_R$ so that the transactor 26, 28, 30 and 32 respectively develop the quantities $I_AZ_R$, $I_BZ_R$, $I_CZ_R$ and $3I_ZZ_R$.

As further shown in FIG. 2, there are three potential transformers 14, 16, and 18, each comprising a primary winding, one side of which is coupled to a system ground 34. The other side of the primary windings of potential transformers 14, 16, and 18 are respectively coupled to phases A, B, and C of the transmission line 12 so that the potential transformers 14, 16 and 18 develop respectively the quantities $V_{AG}$, $V_{BG}$ and $V_{CG}$ at their secondary windings. The potential transformers 14, 16, and 18 each have a tertiary winding $14_A$, $16_A$ and $18_A$ respectively. The tertiary windings $14_A$, $16_A$ and $18_A$ are arranged in a broken-delta connection across phases A, B, and C as shown in FIG. 2. The tertiary winding $18_A$ has one of its ends connected to substation ground 36. The tertiary windings $14_A$, $16_A$ and $18_A$ have a desired turns ratio so as to develop the quantity $-V_O$. The signals $V_{AG}$, $V_{BG}$, $V_{CG}$ and $-V_O$ are routed to the Positive Sequence network 28 which develops the output signals $V_{A1}$. The signal $V_{A1}$ is routed to a Filter 39. Filter 39 is of a low-pass type and attenuates high frequency transients that may be present on signal $V_{A1}$. The filtered signal $V_{A1}$ is one of the output signals of the circuit arrangement of FIG. 2. The signal $V_{A1}$ is also further routed to a Signal Inverter 46 which develops another output signal $-V_{A1}$ of the circuit arrangement of FIG. 2.

The signal $3I_O Z_R$, developed by transactor 32, is routed to a Scaler 42 having a selected scaling constant of ($\frac{1}{3}$) so as to develop the quantity $I_O Z_R$. The signal $I_O Z_R$ is routed to Signal Inverter 44 which develops the quantity $-I_O Z_R$ that is further applied as a reference signal to Positive Sequence network 40. The output signals $I_A Z_R$, $I_B Z_R$ and $I_C Z_R$ of transactors 26, 28 and 30, respectively, are also routed to the Positive Sequence network 40 which develops the signal $I_{A1} Z_R$. The signal $I_{A1} Z_R$ is routed to a Filter 41. Filter 41 is similar to Filter 39 in that it is of a low-pass type and attenuates high frequency transients that may be present on signal $I_{A1} Z_R$. The filtered signal $I_{A1} Z_R$ is another output signal of the circuit arrangement of FIG. 2.

The signal $I_{A1} Z_R$ is also routed as an input to a Scaler 50 which develops another output signal $I_{A1} Z_R'$ of the circuit arrangement of FIG. 2. The signal $I_{A1} Z_R'$ is also routed to a Signal Inverter 48 which develops a further output signal $-I_{A1} Z_R'$ of the circuit arrangement of FIG. 2.

The output signal $I_{A1} Z_R'$ and $-I_{A1} Z_R'$ are both routed to links or selectable patch plugs (not shown) so as to provide alternate embodiments of the present inventions. The signal $I_{A1} Z_R'$ provides a reverse offset function, whereas, the signal $-I_{A1} Z_R'$ provides a forward offset function. The reverse and forward offset functions are to be described hereinafter.

In one embodiment of the present invention the output signals $I_{A1} Z_R$, $-V_{A1}$ and $+V_{A1}$ of FIG. 2 are applied to the arrangement shown in FIG. 3. In a second embodiment of the present invention the output signals $I_{A1} Z_R$, $-V_{A1}$, $+V_{A1}$ and $-I_{A1} Z_R'$ of FIG. 2 are applied to the circuit arrangement of FIG. 3. Further, in a third embodiment of the present invention the output signals $I_{A1} Z_R$, $-V_{A1}$, $+V_{A1}$ and $I_A Z_R'$ are applied to the circuit arrangement of FIG. 3. The signal paths of the second and third embodiment quantities $-I_{A1} Z_R'$ and $I_{A1} Z_R'$, respectively, are shown in phantom in FIGS. 2 and 3. As will be described hereinafter, the signal $-I_{A1} Z_R'$ and $I_{A1} Z_R'$ of my second and third embodiments are particularly suited for series capacitor compensated transmission lines which encounter heavy load current flow of where a steady state output is required on close-in $3\phi$ Faults.

The following description of FIG. 3 only describes the further development of the signals of the first embodiment $I_{A1} Z_R$, $-V_{A1}$ and $+V_{A1}$. However, it should be recognized that the description of FIG. 3 related to $I_{A1} Z_R$, $-V_{A1}$, and $+V_{A1}$ quantities is equally applicable to the second and third embodiments.

FIG. 3 shows three expressions given by the relationships 1, 2, and 3;

$$A_{A1}Z_R - V_{A1} \tag{1}$$

$$-K(I_{A1}Z_R - V_{A1}) \tag{2}$$

$$(l-K)(I_{A1}Z_R - V_{A1}) \tag{3}$$

Expression (1) is developed by the application of the signal $+I_{A1} Z_R$ to the input of a Summing Amplifier (SUM AMP A) 52 via a resistor $R_1$ and the application of the signal $-V_{A1}$ to the same input of SUM AMP A 52 via a resistor $R_2$. SUM AMP A 52 operates in a conventional manner so as to sum its applied quantities $I_{A1} Z_R$ and $-V_{A1}$ and develop the signal of expression (1).

The signal represented by expression (1) is applied to a Memory Filter 54. Memory Filter 54 provides filtering and a short term memory of the applied signal of expression (1). The operation of the Memory Filter 54 in response to its applied signal of expression (1) develops the signal given in expression (2). The operation of Memory Filter 54 may best be determined by a comparison between its applied signal, which is that of expression (1), and its developed output, which is that of expression (2). Such a comparison reveals that Memory Filter 54 provides a content $-K$.

The $-K$ constant of Memory Filter 54 has a magnitude and a phase shift delay. The phase shift of the $-K$ constant is that of 180 degrees represented by the minus ($-$) signal of the K constant. The magnitude of the K constant is typically selected to be 0.5 relative to the applied signal of expression (1). Further, the Memory Filter 54 develops an output signal (expression (2)) which provides a short term memory of the applied signal of expression (1). As will be described with regard to FIGS. 4–12, Memory Filter 54 assures that the initial output signal represented by expression (2) after a fault inception is a prefault type signal so as to establish a desired transient response of the circuit arrangement of FIG. 3. The prefault type signal is of adequate duration to ensure reliable operation of the relay. The output signal of Memory Filter 54 has a phase relationship which is 180° out of phase with the signal of expression (1) and a magnitude which is (K) times the magnitude of the signal of expression (1).

The signal of expression (3) is generated by the arrangement of resistor $R_Y$ having one of its ends coupled to the output of Memory Filter 54, which is the signal of expression (2), and its other end coupled to: (1) the input of Summing and Squaring Amplifier (SUM AND SQ AMP) 56; (2) one end of a resistor $R_5$ having its other end connected to the output of SUM AND SQ AMP 56, and (3) to one end of a resistor $R_X$ having its other end connected to receive the signal of expression (1). The arrangement of the resistors $R_Y$, $R_X$ and $R_5$ combine or sum the signals represented by expressions (1) and (2) into the signal of expression (3).

The signal of expression (3) is the output of the SUM AND SQ AMP 56 which is also the operating signal $V_{OP}$ of the present invention. The $V_{OP}$ signal is of primary importance to the present invention and is to be further described hereinafter with regard to FIGS. 4–12.

The second primary signal of the present invention is the polarizing signal $V_{POL}$. The $V_{POL}$ signal is developed by a cascaded arrangement of Summing Amplifier C (SUM AMP C) 58, Memory Filter 62, and a Squaring Amplifier (SQ AMP) 64 having a resistor $R_6$ coupled between its input and its output. The Memory Filter 62 in its contribution to the development of the $V_{POL}$ signal provides a similar function as Memory Filter 54 in its contribution to the $V_{OP}$ signal. The Memory Filter 62 operates in a similar manner to Memory Filter 54 but typically has a longer term memory of its applied signal $+V_{A1}$. Memory Filter 62 assures that the initial polarizing signal after a fault inception is the prefault $+V_{A1}$ voltage. The $V_{POL}$ signal is of primary importance to the present invention and is to be described hereinafter with regard to FIGS. 4-12.

In the first embodiment of the present invention the signal $+V_{A1}$ is applied to the input of SUM AMP C 58 via resistor $R_4$, whereas, in the second and third embodiments of the present invention the signal $+V_{A1}$ is applied to SUM AMP C 58 along with the signal $-I_{A1}Z_R'$ and $I_{A1}Z_R'$, respectively, both via a resistor $R_3$. The contribution of signal $-I_{A1}Z_R'$ or $I_{A1}Z_R'$ in the development of $V_{POL}$ is to be described hereinafter.

In the first embodiment, the SUM AMP C 58 develops the $+V_{A1}$ signal which is routed to the Memory Filter 62. The output of Memory Filter 62 is applied to SQ AMP 64 which operates so as to develop a square wave type signal which is the $V_{POL}$ *quantity of FIG. 3*. The $V_{POL}$ signal along with the other primary signal $V_{OP}$ is applied to a Phase Angle Comparator 72.

The Phase Angle Comparator 72 is comprised of AND circuits 66 and 68 and OR circuit 70. The $V_{OP}$ and $V_{POL}$ signals are applied to both the AND circuits 66 and 68. AND circuit 66 develops an output signal, which is applied to OR circuit 70, in response to the positive coincidence between the $V_{OP}$ and $V_{POL}$ signals. Conversely, AND circuit 68 develops an output signal, which is applied to OR circuit 70, in response to the negative coincidence between the $V_{OP}$ and $V_{POL}$ signals. OR circuit 70 generates an output signal in response to receipt of either of the outputs of AND circuits 66 and 68. The output of OR circuit 70 is routed to TIMER 74.

TIMER 74 is selected to correspond to a phase angle related to rated frequency of power source supplying the transmission line 12. For example, TIMER 74 may be set to a value of 3 to 4.16 msec which corresponds to a phase angle of approximately 65° to 90° for one-cycle of a rated 60 Hz power source, or it may be set to 3.6 to 5 msec corresponding to the same 65° to 90° for a 50 Hz rated power source. As previously mentioned, TIMER 74 may be of the type described in U.S. Pat. Applications having Ser. Nos. 369,440 and 378,589 and reference may be made to these U.S. Applications for a more detailed description of a TIMER, such as TIMER 74, and a more detailed description of the mentioned quantities. The shorter operate times, such as 3.0 and 3.6 msec are used where the particular application does not create a risk of relay operation on load current.

TIMER 74, in response to the phase coincidence between the $V_{OP}$ and $V_{POL}$ signals having a duration equal to or greater than the selected phase angle of TIMER 74, develops the output signal of FIG. 3 which is the signal 76 (BLOCK) of the present invention.

The desired operation of my invention may best be described by first discussing the operating $V_{OP}$ signal and the polarizing $V_{POL}$ signal. The $V_{OP}$ signal represented by expression (3) is comprised of two components (1) $I_{A1}Z_R - V_{A1}$ which is the output signal of SUM AMP (A) 52 and (2) $[-K(I_{A1}Z_R - V_{A1})]$ which is the output of Memory Filter 54.

The component of the polarizing $V_{POL}$ signal in the first embodiment of the present invention is $+V_{A1}$. As previously discussed, the $V_{OP}$ and $V_{POL}$ signals are applied to Phase Angle Comparator 72, which develops an output signal during the phase coincidence of $V_{OP}$ and $V_{POL}$. If the coincidence between $V_{OP}$ and $V_{POL}$ exceed a predetermined time, selected by TIMER 74, the 76 BLOCK signal is generated.

My invention selects the polarity of the phase quantity $(I_{A1}Z_R - V_{A1})$ of the $V_{OP}$ signal such that this quantity is "largely in phase" with the component $+V_{A1}$ of the polarizing $V_{POL}$ signal during external faults and "largely out of phase" with $+V_{A1}$ for internal faults. In the foregoing and following descriptions the terms "largely in phase" and "largely out of phase" are used because minor variation of the positive sequence impedances of the system and the effects of load transfer will normally preclude the discussed signals from being precisely in phase or out of phase.

This selected phase relationship of $(I_{A1}Z_R - V_{A1})$ of the $V_{OP}$ signal provides, in part, the desired operation of my relay. For example, in the first embodiment of my invention, if a fault occurs in $D_O$ direction, relative to RELAY X of FIG. 1, it is an external fault and the phasor quantity $(I_{A1}Z_R - V_{A1})$ of the $V_{OP}$ signal is in phase with the $+V_{A1}$ component of the $V_{POL}$ signal, causing the circuit arrangement of FIG. 3 to generate the 76 (BLOCK) signal. Conversely, if a fault occurs in the $D_1$ direction, relative to RELAY X of FIG. 1, the phasor quantity $(I_{A1}Z_R - V_{A1})$ of the $V_{OP}$ signal is out of phase with the $+V_{A1}$ component of the $V_{POL}$ signal, inhibiting the circuit arrangement of FIG. 3 from generating the 76 (BLOCK) signal. The obtainment of the desired in-phase and out-of-phase relationships of the $V_{OP}$ and $V_{POL}$ signals are to be described hereinafter with regard to FIGS. 4-12.

Further, my desired operation is further provided by its initial or transient response determined, in part, by the Memory Filter 54 of FIG. 3. As discussed, my operating signal $V_{OP}$ is comprised of $(I_{A1}Z_R - V_{A1})$ and $(-K)(I_{A1}Z_R - V_{A1})$. For long transmission lines the initial contribution of signal $I_{A1}Z_R - V_{A1}$ to the $V_{OP}$ signal during fault conditions is relatively small. The relatively small initial contribution of $I_{A1}Z_R - V_{A1}$ is mainly determined in that during the initial occurrence of a fault along a long transmission line, travelling waves are created which have an initial low current contribution. With a relatively small contribution from $(I_{A1}Z_R - V_A)$ it is seen that the dominant component of $V_{OP}$ signal is the component $[-K(I_{A1}Z_R - V_{A1})]$ which is the output of the Memory Filter 54. The Memory Filter 54 causes my relay to operate for a short period with a prefault signal after the fault inception. The initial transient output of Memory Filter 54 is the prefault signal $(I_{A1}Z_R - V_{A1})$ inverted and multiplied by the factor of K.

The Memory Filter 54 produces an initial quantity which is in phase with the component $+V_{A1}$ of the polarizing signal $V_{POL}$ created in response to an external fault so as to cause my relay to correctly respond to an external fault occurrence by the generation of a 76 (BLOCK) signal. This desired operation of my relay relative to its transient response is to be further described hereinafter with regard to FIG. 5.

Still further, my desired operation of my relay is obtained by the selection of the angle and magnitude of my $Z_R$ quantity and also for further embodiments by the selection of the angle and magnitude of my $Z_R'$ quantity.

The angle of my $Z_R$ quantity is selected by means of transactors 26 . . . 30 of FIG. 2 to be approximately equal to the angle of the positive sequence source impedance behind the relay location, for example, the angle of the positive sequence of $Z_{SX}$ of Source X for relay X in FIG. 1. The positive sequence impedance of Source X may be represented as $Z_{S1X}$. The magnitude of $Z_R$ is selected by means of transactors 26 . . . 30 of FIG. 2 (which adjustment may be supplemented by voltage taps on the potential supply but not shown in FIG. 2) to be of a magnitude equal to or greater than a quantity of a constant K, times the magnitude of the equivalent positive sequence source impedance behind the relay location, for example, the magnitude of the equivalent positive sequence component of $Z_{SX}$ of Source X for relay of FIG. 1. A further consideration in the selection of the magnitude of $Z_R$ is that it should be equal or larger than the impedance by which the remote tripping always overreach the end of the line. For example, if the tripping relays at Y in FIG. 1 have a reach of 125% of the impedance of transmission line 12, then the blocking relay at X should be set equal or greater than 25% of the impedance of transmission line 12 to ensure a steady state blocking signal for 3-phase (3φ) faults within the reach of the tripping relays at Y.

In alternate embodiments of my invention, that is, the embodiments related to the $-I_{A1}Z_R'$ and $+I_{A1}Z_R'$ quantities shown in phantom in FIGS. 2 and 3, the angle of $Z_R'$ is selected equal to $Z_R$. The magnitude and signal of $Z_R'$ is a function of the particular application. In most cases the sign will be positive and the magnitude will be very small, that is, only large enough to maintain sufficient polarizing signal, for a bolted 3-phase (3φ) fault behind the relay, so as to provide steady state operation of the relay. In a few cases, where the magnitude of the product of load current and $Z_R$ is large, then the sign of $Z_R'$ is selected to be negative and the magnitude is selected to ensure that the coincidence of the $V_{OP}$ and $V_{POL}$ during non-fault conditions is safely below the coincidence timer setting. However, when $Z_R'$ is zero in magnitude, or has a negative sign, then the block output will not be a steady state output for close-in three phase faults. The duration of the polarizing signal will depend on the duration of the Memory Filter 62 in the polarizing circuit before it decays below the sensitivity level of the polarizing circuit (or reverses as would be the case when $Z_R'$ has a negative sign). In practice, where the blocking relay may only have a transient output on external faults (such as series capacitor compensated lines) the blocking relay is equipped with a delayed reset timer which extends the transient blocking signal beyond the fault clearing time and the reset time of the tripping relays at the remote terminal.

It was noted hereinabove that the initial fault current through a long line, for a fault just behind the relay location shown in FIG. 1 in the $D_O$ direction relative to RELAY X so as to be detected as an external type fault by the RELAY X of FIG. 1, is essentially travelling wave currents.

These travelling wave currents tend to produce transient delays in prior art distance relays designed for steady state operation since the polarizing signal is primarily the fundamental frequency, whereas the operate signal initially has the frequency components associated with the travelling waves. However, for bolted, 3-phase (3φ) faults immediately behind the relay where high operating speed is most desirable in a blocking relay, the change in the positive sequence voltage $V_{A1}$ will be a maximum, thus establishing a large component of the operating signal $V_{OP}$ due to the prefault signal $[-K(I_{A1}Z_R-V_{A1})]$ developed by Memory Filter 54. Conversely, the quantity of $I_{A1}Z_R$ will tend to be rather small initially since $I_{A1}$ is initially limited by the surge impedance of the line which typically is very much larger than $Z_{S1X}$ (and hence $Z_R$). Thus the signal $[-K(I_{A1}Z_R-V_{A1})]$ is much larger than the signal $I_{A1}Z_R$, resulting in high speed operation. This high speed operation is desired because, as discussed in the "Background" Section, there is a possibility of saturation of an adversely located current transformer (CT) that could cause misoperation of the trip relays.

A still further feature of my invention results from its capability to operate if the three phase potential to the relay is suddenly substantially reduced. One advantage is that the blocking directional relay will operate on the failure of the three phase potentials on a three phase system, and hence the operation of the blocking unit can be used to block the trip units on a transient basis should they attempt to operate as a result of the three phase potential failure.

My inventive concept and its related advantages may best be further described by first discussing the desired operational response of my relay.

OPERATIONAL RESPONSE

The overall operational response of my invention is depicted in FIGS. 4–12 and the overall response of my relay is also arranged in a tabular form as Table 2.

TABLE 2

| FIGS. | Fault Current | Response Type | | 3φFault Location | | $V_{OP}$ & $V_{POL}$ | | Output |
|---|---|---|---|---|---|---|---|---|
| | | Steady-State | Transient | Int. | Ext. | In-Phase | Out-of-Phase | |
| 4 | No | — | — | — | — | | ✓ | No Block |
| 5 | No | | ✓ | | ✓ | ✓ | | Block |
| 6 | Yes | | ✓ | | ✓ | ✓ | | Block |
| 7 | No | ✓ | | | ✓ | | $V_{OP}=0$ | No Block |
| 8 | Yes | ✓ | | | ✓ | ✓ | | Block |
| 9 | No | | | ✓ | ✓ | | ✓ | Block |
| 10 | Yes | | | ✓ | ✓ | | ✓ | No Block |
| 11 | No | ✓ | | ✓ | | | $V_{OP}=0$ | No Block |
| 12 | Yes | ✓ | | ✓ | | | | No Block |

Table 2 is arranged into six columns, (1) Figs. listing FIGS. 4–12, (2) FAULT CURRENT indicated by either a Yes or a No condition, (3) RESPONSE TYPE having subcolumns Steady-State and Transient, (4) 3φ FAULT Location having subcolumns Int. (Internal) and Ext. (External), (5) $V_{OP}$ and $V_{POL}$ having subcolumns In-Phase and Out-of-Phase, and (6) OUTPUT which is either the BLOCK or NO BLOCK function of the present invention.

FIGS. 4–12, to be described, are arranged in accordance with nine various conditions related to Table 2. The nine conditions may be segmented in: (1) a first condition of No load current and No fault current flowing in transmission line 12 of FIG. 1 and responded to in my invention by the non-generation of a BLOCK signal as shown in FIG. 4, (2) four conditions of a 3φ External Fault associated with the transmission line 12 of FIG. 1 and located immediately behind my relay, which, in turn, are responded to by my relay as shown in FIGS. 5–8, and (3) four conditions of a 3φ Internal Fault associated with transmission line 12 and located immediately in-front-of my relay, which, in turn, are responded to by my relay as shown in FIGS. 9–12.

Figure 7:
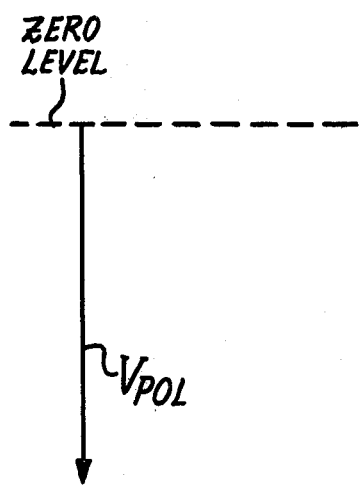
FIG. 7 shows the steady-state output response of the present relay to a condition in which no current is created by an External 3$\phi$ Fault occurring immediately behind the relay.
Figure 8:
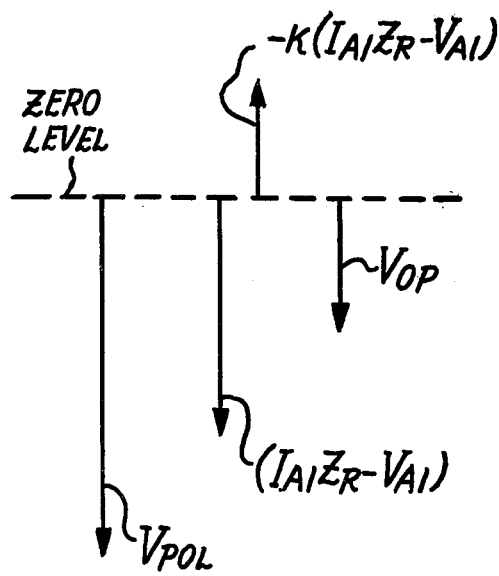
FIG. 8 shows the steady-state output response of the present relay to a condition in which fault current is created by an External 3$\phi$ Fault occurring immediately behind the relay.

The response of my relay to the 3φ External Fault conditions may be further segmented into my relay's transient response as shown in FIGS. 5 and 6, and my relay's Steady-State response as shown in FIGS. 7 and 8. Similarly, the response of my relay to the 3φ Internal Fault conditions may be further segmented into my relay's transient response as shown in FIGS. 9 and 10, and my relay's Steady-State response as shown in FIGS. 11 and 12.

Still further, the response of my relay to the four 3φ External Fault conditions arranged in Table 2 may be still further segmented into the generation of the BLOCK signal for three of the 3φ External Fault conditions illustrated by FIGS. 5, 6, and 8 and the non-generation of the BLOCK signal for one of the 3φ External Fault conditions illustrated by FIG. 7. It should be noted that the non-generation of a BLOCK signal of FIG. 7 to an External Fault condition is not the correct response; and as will be discussed later with regard to Table 3 and FIG. 5, my invention does respond correctly to this External Fault by the generation of the BLOCK signal.

Figure 9:
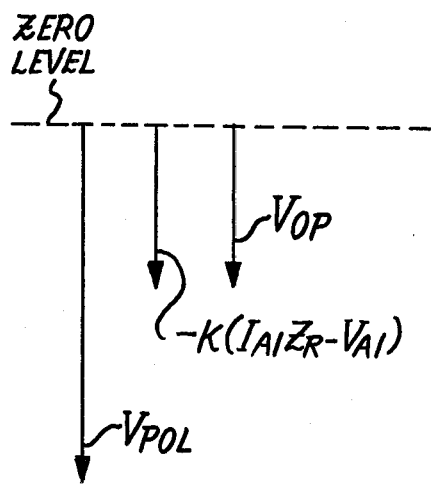
FIG. 9 shows the transient output response of the present relay to a condition in which no current is created by an Internal 3$\phi$ Fault occurring immediately in-front-of the relay.
Figure 10:
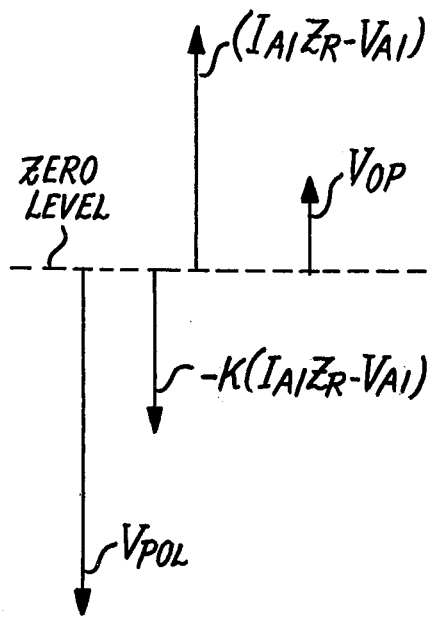
FIG. 10 shows the transient output response of the present relay to a condition in which fault current is created by an Internal 3$\phi$ Fault occurring immediately in-front-of the relay.
Figure 11:
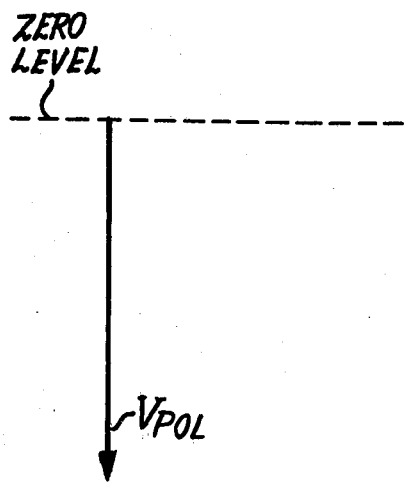
FIG. 11 shows the steady-state output response of the present relay to a condition in which no current is created by an Internal 3$\phi$ Fault occurring immediately in-front-of the relay.
Figure 12:
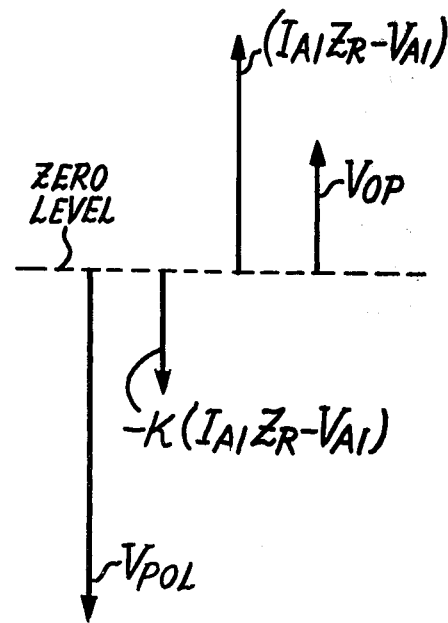
FIG. 12 shows the steady-state output response of the present relay to a condition in which fault current is created by an Internal 3$\phi$ Fault occurring immediately in-front-of the relay.

The response of my relay to the four 3φ Internal Fault conditions arranged in Table 1, may be still further segmented into my relays non-generation of the BLOCK signal for three of 3φ Internal Fault conditions illustrated by FIGS. 10, 11 and 12 and my relays generation of the BLOCK signal for one of the 3φ Internal Fault conditions illustrated by FIG. 9. It should be noted that the response of my relay of FIG. 9 generating a BLOCK signal for a 3φ Internal Fault is incorrect. The conditions associated with FIG. 9 are unlikely in a practical system but can occur, for example, if the circuit breaker C.B.X is open for a fault in front of relay X. In this case, the signal 76 (BLOCK) can be inhibited by a signal from the breaker indicating that the breaker is open, or the 76 BLOCK signal can be inhibited if a sensitive current detector relay is not energized.

The desired response of my relay is controlled by the various phasor quantities shown in FIGS. 4–12 which are developed by the circuit arrangement 60 of FIG. 3.

The positive sequence undervoltage distance relay of my invention has some similarities to a positive sequence distance relay of the prior art. The steady state performance of these two relays is substantially the same, but the transient response is very different. The inventive concept of my invention is related to an improved transient response obtained by my positive sequence undervoltage distance relay. The improved transient response is primarily obtained in the circuit of FIG. 3 by the inclusion of a Memory Filter 54 for supplying a signal $-K (I_{A1}Z_R - V_{A1})$ to the SUM and SQ AMP 56 in additive relation to the $I_{A1}Z_R - V_{A1}$ signal supplied through resistor $R_X$.

The addition of Memory Filter 54 in this relationship modifies the transient response by producing a briefly continuing signal tending to cause the relay to operate for a short period after a fault occurs. The initial transient output of Memory Filter 54 following fault inception is the prefault signal $(I_{A1}Z_R - V_{A1})$ inverted and multiplied by the factor K of Filter 54. The output of Memory Filter 54 reduces the magnitude of the signal produced by the summer portion of circuit 56 to a value of $(1-K)(I_{A1}Z_R - V_{A1})$, but since this is the input to a squaring amplifier, the practical difference between the undervoltage distance relay and a distance relay is a minor change in sensitivity on a steady state basis. However, the transient response of my relay provides the desired operation by generating a 76 (BLOCK) signal in response to a 3φ External Fault as shown in FIG. 5. The desired response of my undervoltage distance relay may be more clearly seen by reference to Table 3.

TABLE 3

| | External 3φ Fault Occurrence Immediately Behind Relay | | | | |
|---|---|---|---|---|---|
| | Phasor Contributors to $V_{OP}$ Signal | | | $V_{POL}$-$V_{OP}$ | |
| FIGS. | $V_{A1}$ | $I_{A1}Z_R$ | $(-K)(I_{A1}Z_R$-$V_{A1})$ | Signals | OUTPUT |
| 5 (Transient Response) | 0 | 0 | ✓ | $V_{OP}$ in-phase with $V_{POL}$ | BLOCK |
| 7 (Steady-State Response) | 0 | 0 | 0 | $V_{OP}$ = 0 | NO BLOCK |

Table 3 is related to an External 3φ Fault occurrence immediately behind the RELAY. Such an occurrence is shown in FIG. 1 in the $D_O$ direction relative to RELAY X. For such an occurrence, as previously discussed, RELAY X is desired to generate the 76 BLOCK signal of FIG. 3. A review of Table 3 reveals that my transient response, depicted in FIG. 5, correctly generates a BLOCK signal, while the steady-state response, depicted in FIG. 7, does not generate a BLOCK signal.

Table 3 lists the Phasor Contributors, $V_{A1}$, $I_{A1}Z_R$ and $(-K)(I_{A1}Z_R - V_{A1})$, to the $V_{OP}$ signal. A review of Table 3 reveals that the Phasor Contributors $V_{A1}$, $I_{A1}Z_R$ and $-K(I_{A1}Z_R - V_{A1})$ for the steady-state response of FIG. 7 are all of a zero (0) value and accordingly the $V_{OP}$ signal is of a zero (0) value, which, in turn, is sensed by the Phase Angle Comparator 72 of FIG. 3 as a non-coincidence condition of the $V_{OP}$ and $V_{POL}$ signals, which, in turn, does not cause the TIMER 74 to generate the desired 76 (BLOCK) signal. Conversely, a further review of Table 3 reveals that the Phasor Contributors are such as to cause my transient response of FIG. 5 to generate a desired BLOCK signal in response to this 3φ External Fault.

Table 3 shows the transient response of FIG. 5 as having Phasor Contributors $V_{A1}$ and $I_{A1}Z_R$ which are zero but the Phasor Contributor $-K(I_{A1}Z_R - V_{A1})$ is present because of Memory Filter 54. As previously discussed for this External 3φ Fault this $-K (I_{A1}Z_R$-

$-V_{A1}$) develops a $V_{OP}$ which in-phase with $V_{POL}$ so as to generate the 76 (BLOCK) signal of FIG. 3 and Table 3. Although the occurrence of a three phase fault without current is not an expected condition on the power system, it is illustrative of the inputs that the relay would see if (1) the three phase potentials supplying the relay from the power system was suddenly reduced in magnitude due to fuse failure, for example, or, (2) immediately after an actual fault where the fault current is limited by the surge impedance of the line and hence is comparatively small.

It should now be appreciated that the transient response of my undervoltage distance relay provides the correct response to (1) a sudden reduction in the three phase potentials supplying the relay from the power, and (2) limited fault current immediately after an actual fault.

Reference is now made to FIGS. 4-12 which depict the phasor quantities developed by my relay of my first embodiment not utilizing the $-I_{A1}Z_R'$ or $+I_{A1}Z_R'$ quantities in response to various types of 3φ Fault conditions that may occur along transmission line 12.

FIG. 4 shows the response of my relay to normal conditions within the transmission line 12, that is, no fault or no load type currents. For these conditions the $I_{A1}Z_R$ is essentially zero. Still further for these conditions the signal $(I_{A1}Z_R - V_{A1})$ of expression (2) is a positive phasor quantity, and conversely, the signal $-K(I_{A1}Z_R - V_{A1})$ of expression (2) is a negative phasor quantity. Substituting this quantity $I_{A1}Z_R$ equal to zero into expression (3) for the quantity $V_{OP}$ may be shown as follows:

$$V_{OP} = ((1-K)(I_{A1}Z_R - V_{A1})) \quad (6)$$
$$= ((1-K)(0-V_{A1}))$$
$$= 1 - K(-V_{A1})$$

Further, the phasor quantity $V_{POL}$ under the no load and no fault current conditions related to FIG. 4, may be expressed as the quantity $(+V_{A1})$.

Still further, from FIG. 4 it is seen that phasor quantities $V_{OP}$ and $V_{POL}$ are out of phase with respect to each other. For these out-of-phase quantities $V_{OP}$ and $V_{POL}$ the phase angle comparator circuit 72 does not develop an output, which, in turn, does not activate TIMER 74, which, in turn, does not cause the generation of the 76 (BLOCK) signal of my invention.

The operation of my invention to the conditions related to FIG. 4 may be stated in a condensed manner by the expression of FIG. 4 as "$V_{OP}=1-K(-V_{A1})$ since $I_{A1}Z_R = 0$. THUS $V_{OP}$ OUT-OF-PHASE WITH $V_{POL}$ ∴ NO 76 (BLOCK)". This expression is meant to represent that quantity $I_{A1}Z_R$ being equal to zero created a $V_{OP}$ quantity equal to $1-K(-V_{A1})$ and has phase relationship which is out-of-phase with $V_{POL}$. Therefore the signal 76 (BLOCK) is not generated. This condensed manner of expressing the operation of my invention shown for FIG. 4 is to be used in a similar manner hereinafter to express the operation of my invention shown in FIGS. 5-12. Further, load current would cause a phase shift in both the $V_{OP}$ and $V_{POL}$ signals, but generally this would be small and the no load condition of FIG. 4 is illustrated for simplicity.

FIG. 5, previously discussed with regard to Table 3, shows the transient output response of my relay to an External 3φ Fault immediately behind my relay causing no current to flow, that is, no fault or no load current. Still further, as previously discussed with regard to Table 3, the prefault type signals developed by Memory Filter 54 and Memory Filter 62 are the dominant contributors to the signals $V_{OP}$ and $V_{POL}$, respectively, of FIG. 5 and also of FIGS. 6, 9 and 10 to be discussed. Further, the phasor quantity $-K(I_{A1}Z_R-V_{A1})$ created by this condition is a negative going type. For this condition the quantities $I_{A1}Z_R = 0$ and $V_{A1} = 0$. Substituting these quantities into the expressions for $V_{OP}$ and $V_{POL}$, in a manner similar to that described for FIG. 4, yields $V_{OP}=K(V_{A1})$ and $V_{POL}=(+V_{A1})$. Further, the negative phasor quantity $-K(I_{A1}Z_R-V_{A1})$ develops a $V_{OP}$ quantity which is in phase with the $V_{POL}$ quantity.

The operation of my relay shown by FIG. 5 may be expressed in a condensed manner as "$V_{OP}=K(V_{A1})$ since $I_{A1}Z_R=0$ and $V_{A1}=0$. THUS $V_{OP}$ IN PHASE WITH $V_{POL}$ ∴ 76 (BLOCK)" which is meant to represent that $V_{OP}=K(V_{A1})$ and is in phase with $V_{POL}$, therefore my relay generates the output signal 76 (BLOCK) of FIG. 3.

FIG. 6 shows the transient output response of my relay to an External 3φ Fault immediately behind my relay causing fault current to flow. For this condition the quantity $V_{A1}=0$. Further the phasor quantity $-K(I_{A1}Z_R-V_{A1})$ is shown in FIG. 6 as a negative going type. Substituting this quantity into expressions for $V_{OP}$, in a manner similar to that described for FIGS. 4 and 5, yields $V_{OP}=K(V_{A1})+I_{A1}Z_R$. Thus, the $V_{OP}$ quantity is in phase with the $V_{POL}$ quantity.

The operation of my relay shown by FIG. 6 may be expressed in a condensed manner as "$V_{OP}=K(V_{A1})+I_{A1}Z_R$ since $V_{A1}=0$. Thus $V_{OP}$ IN PHASE WITH $V_{POL}$ ∴ 76 (BLOCK)" which is meant to represent that $V_{OP}=K(V_{A1})+I_{A1}Z_R$ and is in phase with $V_{POL}$, therefore my relay generates the output signal 76 (BLOCK) of FIG. 3.

FIG. 7 shows the steady-state output response of my relay to an External 3φ Fault immediately behind my relay which is such as to not cause current to flow, that is no fault or no load current flow. FIG. 7 and also FIGS. 8, 11 and 12 to be described show the steady state output whose duration is established by Memory Filter 62 of FIG. 3 which contributes to the development of the $V_{POL}$ signal. Further, for this condition the quantities $I_{A1}Z_R=0$ and $V_{A1}=0$. Substituting this quantity into expressions for $V_{OP}$, in a manner similar to that described for FIG. 4, yields $V_{OP}=0$.

The operation of my relay shown by FIG. 7 may be expressed in a condensed manner by simply stating $V_{OP}=0$, therefore my relay under steady-state conditions does not generate the output signal 76 (BLOCK) of FIG. 3. This is not a problem because the desired output signal 76 (BLOCK) is generated in response to such fault by my relay's transient response shown in FIG. 5.

FIG. 8 shows the steady-state output response of my relay to an External 3φ Fault immediately behind my relay causing fault current to flow. For this condition the quantity $V_{A1}=0$. Further, this condition causes a positive going vector quantity $-K(I_{A1}Z_R-V_{A1})$ and a negative going $(I_{A1}Z_R-V_{A1})$. Substituting the $V_{OP}$ quantities of FIG. 8 into the expression for $V_{OP}$, in a manner similar to that described for FIG. 4, yields $V_{OP}=(1-K)(I_{A1}Z_R)$. Further, the positive phase quantity $-K(I_{A1}Z_R-V_{A1})$ and the negative phasor quantity $(I_{A1}Z_R-V_{A1})$ of FIG. 8 develop a $V_{OP}$ quantity which is in phase with the $V_{POL}$ quantity.

The operation of my relay shown by FIG. 8 may be expressed in a condensed manner as "$V_{OP}=(1-K)$ ($I_{A1}Z_R$) since $V_{A1}=0$. Thus $V_{OP}$ IN PHASE WITH $V_{POL}$ ∴ 76 (BLOCK)" which is meant to represent that $V_{OP}=(1-K)(I_{A1}Z_R)$ and is in phase with $V_{POL}$, therefore my relay generates the output signal 76 (BLOCK) of FIG. 3.

FIG. 9 shows the transient output response of my relay to an Internal 3φ Fault immediately in front of my relay causing no current to flow, that is no fault or no load current. For this condition the quantities $I_{A1}Z_R=0$ and $V_{A1}=0$. Further, the phasor quantity $-K(I_{A1}Z_R-V_{A1})$ of FIG. 9 is a negative going type. Substituting this quantity for $V_{OP}$, in a manner similar to that described for FIG. 4, yields $V_{OP}=K(V_{A1})$. Further, the negative phasor quantity $-K(I_{A1}Z_R-V_{A1})$ develops a $V_{OP}$ quantity which is in phase with the $V_{POL}$ quantity.

The operation of my relay shown by FIG. 9 may be expressed in a condensed manner as "$V_{OP}=K(V_{A1})$ since $I_{A1}Z_R=0$ and $V_{A1}=0$. THUS $V_{OP}$ IN PHASE WITH $V_{POL}$ ∴ 76 (BLOCK)" which is meant to represent that $V_{OP}=K(V_{A1})$ and is in phase with $V_{POL}$, therefore my relay generates the output signal 76 (BLOCK) of FIG. 3. As previously discussed, the generation of a 76 (BLOCK) signal in response to this unlikely Internal Type Fault is incorrect and other means for inhibiting the 76 (BLOCK) signal such as a signal from a circuit breaker indicating its open condition may be provided.

FIG. 10 shows the transient output response of my relay to an Internal 3φ Fault immediately in front of my relay causing fault current to flow. For this condition the quantities $V_{A1}=0$ and $|I_{A1}Z_R|>|K V_{A1}|$. Further, FIG. 10 shows the phasor quantity $(I_{A1}Z_R-V_{A1})$ to be of a positive going type and the phasor quantity $-K(I_{A1}Z_R-V_{A1})$ to be of a negative going type. Substituting these quantities for $V_{OP}$, in a manner similar to that described for FIG. 4, yields $V_{OP}=I_{A1}Z_R+K V_{A1}$. Further, the negative phasor quantity $-K(I_{A1}Z_R-V_{A1})$ and the positive phasor quantity $(I_{A1}Z_R-V_{A1})$ develop a $V_{OP}$ quantity which is out-of-phase with the $V_{POL}$ quantity when $Z_R$ is selected greater than K times the equivalent positive sequence source impedance behind the relay.

The operation of my relay shown by FIG. 10 may be expressed in a condensed manner as "$V_{OP}=-I_A Z_R+K V_{A1}$ since $V_{A1}=0$. THUS $V_{OP}$ OUT-OF-PHASE WITH $V_{POL}$ ∴ NO 76 (BLOCK)" which is meant to represent that $V_{OP}=-I_{A1}Z_R+K V_{A1}$ and is out-of-phase with $V_{POL}$, therefore my relay does not generate the output signal 76 (BLOCK) of FIG. 3.

FIG. 11 shows the steady-state output response of my relay to an Internal 3φ Fault immediately in front of my relay which does not cause fault or load current to flow. For this condition the quantities $I_{A1}Z_R=0$ and $V_{A1}=0$. Substituting these quantities for $V_{OP}$, in a manner similar to that described for FIG. 4 yields $V_{OP}=0$.

The operation of my relay shown by FIG. 11 for a $V_{OP}=0$ does not allow my relay to generate the output signal 76 (BLOCK) of FIG. 3.

FIG. 12 shows the steady-state output response of my relay to an Internal 3φ Fault immediately in front of my relay causing fault current to flow. For this condition $V_{A1}=0$. Further, FIG. 12 shows the quantity $(I_{A1}Z_R-V_{A1})$ of a positive going type, and the phasor quantity $-K(I_{A1}Z_R-V_{A1})$ of a negative going type.

Substituting the quantities $-K(I_{A1}Z_R-V_{A1})$ and $(I_{A1}Z_R-V_{A1})$ shown in FIG. 12 into the expression for $V_{OP}$ in a manner similar to that described for FIG. 4 yields $V_{OP}=(1-K)(-I_{A1}Z_R)$. Further, the negative phasor quantity $-K(I_{A1}Z_R-V_{A1})$ and the positive phasor quantity $(I_{A1}Z_R-V_{A1})$ develop a $V_{OP}$ quantity which is out-of-phase with the $V_{POL}$ quantity.

The operation of my relay shown by FIG. 12 may be expressed in a condensed manner as "$V_{OP}=(1-K)(-I_{A1}Z_R)$ since $V_{A1}=0$. THUS $V_{OP}$ OUT-OF-PHASE WITH $V_{POL}$ ∴ NO 76 (BLOCK)" which is meant to represent that $V_{OP}=(1-K)(-I_{A1}Z_R)$ and is out-of-phase with $V_{POL}$, therefore my relay does not generate the output signal 76 (BLOCK) of FIG. 3.

It should be appreciated that my undervoltage distance relay of my first embodiment develops the desired blocking signal in response to external type faults that may occur along a transmission line, and conversely, does not develop the blocking signal for internal type faults that may occur along the transmission line.

In the second embodiment of my invention I utilize the signal $-I_{A1}Z_R$ as a forward offset function and in my third embodiment of my invention I utilize the signal $+I_{A1}Z_R'$ as a reverse offset function.

As previously discussed the signals $-I_{A1}Z_R'$ and $+I_{A1}Z_R'$ are developed by the circuit arrangement of FIG. 2 and are routed to FIG. 3. The signals $-I_{A1}Z_R'$ or $+I_{A1}Z_R'$ is a phasor contributor to the $V_{POL}$ developed by the circuit arrangement of FIG. 3. For the phasor contribution of $-i_{A1}Z_R'$ the $V_{POL}$ may be expressed as $V_{POL}=V_{A1}-I_{A1}Z_R'$, whereas, for $+I_{A1}Z_R'$ $V_{POL}$ may be expressed as $V_{POL}=V_{A1}+I_{A1}Z_R'$.

Further, as previously discussed with regard to the selection of my $Z_R'$ quantity these signals $-I_{A1}Z_R'$ and $+I_{A1}Z_R'$ may be utilized to provide the desired phase relationship of $V_{POL}$ relative to the $V_{OP}$ quantity under various operating conditions of my relay. The $-I_{A1}Z_R'$ and $+I_{A1}Z_R'$ quantities by altering the phase relationship of $V_{POL}$ may be used as the means for adapting the $V_{POL}$ signal to various fault conditions that may occur along the transmission line.

Still further, as previously discussed by invention contemplates further embodiments utilizing line to ground voltages, line to line voltages, phase currents and delta type currents. The further contemplated embodiments of my invention are arranged in Table 4.

TABLE 4

| 1 | 2 | 3 | 4 | 5 | 6 |
|---|---|---|---|---|---|
| $B_{A1}$ | $V_{AB}$ | $V_{BC}$ | $V_{CA}$ | $V_{AG}$ | $V_{BG}$ | $V_{CG}$ |
| $I_{A1}$ | $I_A$-$I_B$ | $I_B$-$I_C$ | $I_C$-$I_A$ | $I_A$ | $I_B$ | $I_C$ |

Table 4 is arranged in a manner to show the additional contemplated embodiments relative to the hereinbefore description of the $V_{A1}$ and $I_{A1}$ quantities of FIGS. 2 and 3. For example, the contemplated embodiment 1 of Table 4 shows that the $V_{AB}$ and $I_A$-$I_B$ respectively in line with $V_{A1}$ and $I_{A1}$. For such an embodiment the phase-to-phase voltage $V_{AB}$ is utilized to replace the $V_{A1}$ quantity of the Positive Sequence Network 38 of FIG. 2 and the $I_A$-$I_B$ delta current is utilized to replace the $I_{A1}Z_R$ output of the Positive Sequence Network 40. For such a contemplated embodiment the Positive Sequence Networks 38 and 40 are no longer needed. It should be recognized that for such an embodiment the potential transformers 14, 16 and 18 of FIG. 2 are arranged so as to develop the $V_{AB}$ quantity and current transformers 20, 22 and 24 are arranged so as to develop the $I_A$-$I_B$ delta currents. Similarly, the coupling devices 14 ... 24 of FIG. 2 are arranged so as to develop the quantities of the contemplated embodiments 2, 3, 4, 5 and 6 of Table 4.

Although the illustrative embodiments use Filters, such as 54 and 62 for providing a short term memory it is to be understood that other types of circuits having short term memory capabilities could instead be used. One such short term memory circuit is a suitable shift register.

While I have shown and described particular emnodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim is:

1. An undervoltage distance relay for association with a three phase transmission line and adapted to provide a blocking signal in response to the occurrence of a fault behind the relay but providing no blocking signal in response to the occurrence of a fault on the transmission line in front of the relay, the relay comprising:

(a) means for developing quantities $-V_1$, $+V_1$, and $I_1Z_R$, where:

$V_1$ is a signal representative of the positive sequence component of the phase to ground or phase to phase voltages of the transmission line, $I_1$ is a signal representative of the positive sequence component of the phase currents of the transmission line when $V_1$ is related to phase to ground voltage and is a signal representation of the positive sequence component of the delta currents when $V_1$ is related to phase to phase voltage, $Z_R$ is a replica impedance of the equivalent positive sequence source impedance behind the relay and is of a magnitude equal to or greater than a quantity of a constant K times said equivalent positive sequence source impedance, (b) first summing means for summing $I_1Z_R$ and $-V_1$ and developing a signal $(I_1Z_R-V_1)$, (c) first means for receiving said signal $(I_1Z_R-V_1)$ and developing an output signal $(-K)(I_1Z_R-V_1)$, where K is a constant having a value selected between the range of 0.5 to 1.0 and has an out-of-phase relationship with $(I_1Z_R-V_1)$, said first means having a short term memory that enables it to continue developing said output signal after removal of or change to the received signal, (d) second summing means for receiving and summing together said signals $(I_1Z_R-V_1)$ and $(-K)(I_1Z_R-V_1)$, so as to develop a signal $(1-K)(I_1Z_R-V_1)$, expressed as an operating $V_{OP}$ signal, (e) second means for receiving said $+V_1$ signal and developing a polarizing signal $V_{POL}$ representative of the $+V_1$ signal, said second means having a short term memory that enables it to continue developing said polarizing signal after removal of or change to the received $+V_1$ signal, and, (f) coincidence detection means for comparing the phase of the operate signal $V_{OP}$ with the phase of the polarizing signal $V_{POL}$ and developing a blocking signal when the phase coincidence between $V_{OP}$ and $V_{POL}$ exceeds a predetermined duration.

2. An undervoltage distance relay for association with a three phase transmission line and adapted to provide a blocking signal in response to the occurrence of a fault behind the relay but providing no blocking signal in response to the occurrence of a fault on the transmission line in front of the relay, the relay comprising:

(a) means for developing quantities $-V_1$, $+V_1$, $I_1Z_R$, and $-I_1Z_R'$ where:

$V_1$ is a signal representative of the positive sequence component of the phase to ground or phase to phase voltages of the transmission line, $I_1$ is a signal representative of the positive sequence component of the phase currents of the transmission line when $V_1$ is related to phase to ground voltage and is a signal representation of the positive sequence component of the delta currents when $V_1$ is related to phase to phase voltage, $Z_R$ is a replica impedance of the equivalent positive sequence source impedance behind the relay and is of a magnitude equal to or greater than a quantity of a constant K times said equivalent positive sequence source impedance, $Z_R'$ is an offset impedance having an angle selected to be substantially equal to the $Z_R$ replica impedance, (b) first summing means for summing $I_1Z_R$ and $-V_1$ and developing a signal $(I_1Z_R-V_1)$, (c) first means for receiving said signal $(I_1Z_R-V_1)$, and developing an output signal $(-K)(I_1Z_R-V_1)$, where K is a constant having a value selected between the range of 0.5 to 1.0 and has an out-of-phase relationship with $(I_1Z_R-V_1)$, said first means having a short term memory that enables it to continue developing said output signal after removal of or change to the received signal, (d) second summing means for receiving and summing together said signals $(I_1Z_R-V_1)$ and $(-K)(I_1Z_R-V_1)$, so as to develop a signal $(1-K)(I_1Z_R-V_1)$ expressed as an operating $V_{OP}$ signal, (e) third summing means for receiving and summing together signals representing said $+V_1$ and $-I_1Z_R'$ signals to provide a summation signal representing $+V_1-I_1Z_R'$, (f) second means for receiving said summation signal and developing a polarizing signal $V_{POL}$ representative of $+V_1-I_1Z_R'$, said second means having a short term memory that enables it to continue developing said polarizing signal $V_{POL}$ after removal of or a change to the received summation signal, said $Z_R'$ quantity being selected to have a magnitude so as to minimize the phase angle coincidence between the $V_{OP}$ and $V_{POL}$ signals during non-fault conditions related to said transmission line, and, (g) coincidence detection means for comparing the phase of the operate signal $V_{OP}$ with the phase of the polarizing signal $V_{POL}$ and developing a blocking signal when the phase coincidence between $V_{OP}$ and $V_{POL}$ exceeds a predetermined duration.

3. An undervoltage distance relay for association with a three phase transmission line and adapted to provide a blocking signal in response to the occurrence of a fault behind the relay but providing no blocking signal in response to the occurrence of a fault on the transmission line in front of the relay, the relay comprising:

(a) means for developing quantities $-V_1$, $+V_1$, $I_1Z_R$, and $+I_1Z_R'$ where:

$V_1$ is a signal representative of the positive sequence component of the phase to ground or phase to phase voltages of the transmission line, $I_1$ is a signal representative of the positive sequence component of the phase currents of the transmission line when $V_1$ is related to phase to ground voltage and is a signal representation of the positive sequence component of the delta currents when $V_1$ is related to phase to phase voltage, $Z_R$ is a replica impedance of the equivalent positive sequence source impedance behind the relay and is of a magnitude equal to or greater than a quantity of a constant K times said equivalent positive sequence source impedance, $Z_R'$ is an offset impedance having an angle selected to be substantially equal to the $Z_R$ replica impedance, (b) first summing means for summing $I_1Z_R$ and $-V_1$ and developing a signal $(I_1Z_R-V_1)$, (c) first means for receiving said signal $(I_1Z_R-V_1)$, and developing an output signal $(-K)(I_1Z_R-V_1)$, where K is a constant having a value selected between the range of 0.5 to 1.0 and has an out-of-phase relationship with $(I_1Z_R-V_1)$, said first means having a short term memory that enables it to continue developing said output signal after removal of or change to the received signal, (d) second summing means for receiving and summing together said signals $(I_1Z_R-V_1)$ and $(-K)(I_1Z_R-V_1)$, so as to develop a signal $(1-K)(I_1Z_R-V_1)$ expressed as an operating $V_{OP}$ signal, (e) third summing means for receiving and summing together signals representing said $+V_1$ and $+I_1Z_R'$ signals to provide a summation signal representing $+V_1+I_1Z_R'$, (f) second means for receiving said summation signal and developing a polarizing signal $V_{POL}$ representative of $+V_1+I_1Z_R'$, said second means having a short term memory that enables it to continue developing said polarizing signal $V_{POL}$ after removal of or change to the received summation signal, said $Z_R'$ quantity being selected to have a magnitude so as to maintain a steady-state operation when the component $V_1$ of the $V_{POL}$ signal approaches a zero condition, and (g) coincidence detection means for comparing the phase of the operate signal $V_{OP}$ with the phase of the polarizing signal $V_{POL}$ and developing a blocking signal when the phase coincidence between $V_{OP}$ and $V_{POL}$ exceeds a predetermined duration.

4. The relay according to either claim 1, claim 2 or claim 3 wherein said second means for receiving has a short term memory greater than the short term memory of said first means for receiving.

5. The relay according to either claim 1, claim 2 or claim 3 in which said first summing means immediately ceases to develop said $(I_1Z_R-V_1)$ signal when the means of (a) ceases developing the $V_1$ and $I_1Z_R$ signals.

6. The relay according to either claim 1, claim 2, or claim 3 in which the means for developing the quantities $V_1$ and $I_1Z_R$ develops a quantity $I_1Z_R-V_1$ which (a) is of the same polarity to that of $+V_1$ in response to a fault behind the relay and (b) is of the opposite polarity to the $+V_1$ in response to a fault in front of the relay.

7. An undervoltage distance relay for association with a three phase transmission line and adapted to provide a blocking signal in response to the occurrence of a fault behind the relay but providing no blocking signal in response to the occurrence of a fault on the transmission line in front of the relay, the relaying comprising:

(a) means for developing quantities $-V$, $+V$, and $IZ_R$, where:

V is a signal representative of the phase to ground or phase to phase voltages of the transmission line, I is a signal representative of the phase current of the transmission line when V is related to phase to ground voltage and is a signal representation of the delta currents when V is related to phase to phase voltage, $Z_R$ is a replica impedance of the equivalent positive sequence source impedance behind the relay and is of a magnitude equal to or greater than a quantity of a constant K times said equivalent positive sequence source impedance, (b) first summing means for summing $IZ_R$ and $-V$ and developing a signal $(IZ_R-V)$, (c) first means for receiving said signal $(IZ_R-V)$ and developing an output signal $(-K)(IZ_R-V)$, where K is a constant having a value selected between the range of 0.5 to 1.0 and has an out-of-phase relationship with $(IZ_R-V)$, said first means having a short term memory that enables it to continue developing said output signal after removal of or change to the received signal, (d) second summing means for receiving and summing together said signals $(IZ_R-V)$ and $(-K)(IZ_R-V)$, so as to develop a signal $(1-K)(IZ_R-V)$, expressed as an operating $V_{OP}$ signal, (e) second means for receiving said $+V$ signal and developing a polarizing signal $V_{POL}$ representative of the $+V$ signal, said second means having a short term memory that enables it to continue developing said polarizing signal after removal of or change to the received $+V$ signal, and, (f) coincidence detection means for comparing the phase of the operate signal $V_{OP}$ with the phase of the polarizing signal $V_{POL}$ and developing a blocking signal when the phase coincidence between $V_{OP}$ and $V_{POL}$ exceeds a predetermined duration.

8. An undervoltage distance relay for association with a three phase transmission line and adapted to provide a blocking signal in response to the occurrence of a fault behind the relay but providing no blocking signal in response to the occurrence of a fault on the transmission line in front of the relay, the relay comprising:

(a) means for developing quantities $-V$, $+V$, $IZ_R$, and $-IZ_R'$ where:

V is a signal representative of the phase to ground or phase to phase voltages of the transmission line, I is a signal representative of the phase current of the transmission line when V is related to phase to ground voltage and is a signal representation of the delta currents when V is related to phase to phase voltage, $Z_R$ is a replica impedance of the equivalent positive sequence source impedance behind the relay and is of a magnitude equal to or greater than a quantity of a constant K times said equivalent positive sequence source impedance, $Z_R'$ is an offset impedance having an angle selected to be substantially equal to the $Z_R$ replica impedance, (b) first summing means for summing $IZ_R$ and $-V$ and developing a signal $(IR_R-V)$, (c) first means for receiving said signal $(IZ_R-V)$, and developing an output signal $(-K)(IZ_R-V)$, where K is a constant having a value selected between the range of 0.5 to 1.0 and has an out-of-phase relationship with $(IZ_R-V)$, said first means having a short term memory that enables it to continue developing said output signal after removal of or the change to the received signal, (d) second summing means for receiving and summing together said signals ($IZ_R - V$) and ($-K$) ($IZ_R - V$), so as to develop a signal ($1-K$) ($IZ_R - V$) expressed as an operating $V_{OP}$ signal, (e) third summing means for receiving and summing together signals representing said $+V$ and $-IZ_R'$ signals to provide a summation signal representing $+V - IZ_R'$, (f) second means for receiving said summation signal and developing a polarizing signal $V_{POL}$ representative of $+V - IZ_R'$, said second means having a short term memory that enables it to continue developing said polarizing signal $V_{POL}$ after removal of or change to the received summation signal, said $Z_R'$ quantity being selected to have a magnitude so as to minimize the phase angle coincidence between the $V_{OP}$ and $V_{POL}$ signals during non-fault conditions related to said transmission line, and, (g) coincidence detection means for comparing the phase of the operate signal $V_{OP}$ with the phase of the polarizing signal $V_{POL}$ and developing a blocking signal when the phase coincidence between $V_{OP}$ and $V_{POL}$ exceeds a predetermined duration.

9. An undervoltage distance relay for association with a three phase transmission line and adapted to provide a blocking signal in response to the occurrence of a fault behind the relay but providing no blocking signal in response to the occurrence of a fault on the transmission line in front of the relay, the relay comprising:

(a) means for developing quantities $-V$, $-V$, $IZ_R$, and $+IZ_R'$, where:

V is a signal representative of the phase to ground or phase to phase voltages of the transmission line, I is a signal representative of the phase currents of the transmission line when V is related to phase to ground voltage and is a signal representation of the delta currents when V is related to phase to phase voltage, $Z_R$ is a replica impedance of the equivalent positive sequence source impedance behind the relay and is of a magnitude equal to or greater than a quantity of a constant K times said equivalent positive sequence source impedance, $Z_R'$ is an offset impedance having an angle selected to be substantially equal to the $Z_R$ replica impedance, (b) first summing means for summing $IZ_R$ and $-V$ and developing a signal ($IZ_R - V$), (c) first means for receiving said signal ($IZ_R - V$), and developing an output signal ($-K$) ($IZ_R - V$), where K is a constant having a value selected between the range of 0.5 to 1.0 and has an out-of-phase relationship with ($IZ_R - V$), said first means having a short term memory that enables it to continue developing said output signal after removal of or change to the received signal, (d) second summing means for receiving and summing together said signals ($IZ_R - V$) and ($-K$) ($IZ_R - V$), so as to develop a signal ($1-K$) ($IZ_R - V$) expressed as an operating $V_{OP}$ signal, (e) third summing means for receiving and summing together signals representing said $+V$ and $+IZ_R'$ signals to provide a summation signal representing $+V + IZ_R'$, (f) second means for receiving said summation signal and developing a polarizing signal $V_{POL}$ representative of $+V + IZ_R'$, said second means having a short term memory that enables it to continue developing said polarizing signal $V_{POL}$ after removal of or change to the received summation signal, said $Z_R'$ quantity being selected to have a magnitude so as to maintain a steady-state operation when the component V of the $V_{POL}$ signal approaches a zero condition, and (g) coincidence detection means for comparing the phase of the operate signal $V_{OP}$ with the phase of the polarizing signal $V_{POL}$ and developing a blocking signal when the phase coincidence between $V_{OP}$ and $V_{POL}$ exceeds a predetermined duration.

10. The relay according to either claim 7, claim 8 or claim 9 wherein said second means for receiving has a short term memory greater than the short term memory of said first means for receiving.

11. The relay according to either claim 7, claim 8 or claim 9 in which said first summing means immediately ceases to develop said ($IZ_R - V$) signal when the means of (a) ceases developing the V and $IZ_R$ signals.

12. The relay according to either claim 7, claim 8, or claim 9 in which the means for developing the quantities V and $IZ_R$ develops a quantity $IZ_R - V$ which (a) is of the same polarity to that of $+V$ in response to a fault behind the relay and (b) is of the opposite polarity to the $+V_1$ in response to a fault in front of the relay.

* * * * *